United States Patent [19]

Schemmel

[11] Patent Number: 5,036,288
[45] Date of Patent: Jul. 30, 1991

[54] CIRCUIT ARRANGEMENT FOR CLOCK RECOVERY

[75] Inventor: Hans-Robert Schemmel, Nuremberg, Fed. Rep. of Germany

[73] Assignee: U.S. Philips Corporation, New York, N.Y.

[21] Appl. No.: 583,066

[22] Filed: Sep. 14, 1990

[30] Foreign Application Priority Data

Sep. 14, 1989 [DE] Fed. Rep. of Germany ....... 3930751

[51] Int. Cl.$^5$ .......................... H03K 9/04; H03B 1/00
[52] U.S. Cl. ........................ 328/15; 328/139; 328/164; 307/271; 307/269
[58] Field of Search ............... 328/15, 14, 139, 164; 307/271, 269

[56] References Cited

U.S. PATENT DOCUMENTS

| | | | |
|---|---|---|---|
| 3,555,303 | 1/1971 | Kozawa | 328/15 |
| 3,820,034 | 6/1974 | Ball | 328/164 |
| 4,122,397 | 10/1978 | Thomas | 328/139 |
| 4,812,906 | 3/1989 | Wolber | 328/139 |

Primary Examiner—Stanley D. Miller
Assistant Examiner—Toan Tran
Attorney, Agent, or Firm—David R. Treacy

[57] ABSTRACT

For alternatively recovering a clock frequency output signal from an input data signal or an input clock signal, a tuned circuit at the input of the arrangement formed by a secondary winding of a transformer and two series capacitors connected in parallel with the secondary winding is connected in alternative first and second circuit paths to the output of the arrangement. The first circuit path includes a frequency converter for converting a spectral line of the data signal into the clock frequency, while the second circuit path includes a clock divider for converting the input clock signal into the output clock signal. The alternative circuit paths are established by a change-over device which alternatively couples the output of the frequency converter or the output of the clock divider to the output of the arrangement. One of the series capacitors is selectively bridged by a switch, which also controls the state of the change-over device.

6 Claims, 1 Drawing Sheet

CIRCUIT ARRANGEMENT FOR CLOCK RECOVERY

BACKGROUND OF THE INVENTION

1. Field of the Invention

The invention relates to a circuit arrangement for recovering a clock frequency.

2. Description of the Related Art

A circuit arrangement of this type is necessary, for example, in clock recovery circuits for digital transmission networks in communication and data technology, if from a digital input signal a specific clock frequency is to be regenerated. In a digital transmission network in accordance with G 703 (CCITT=CommitéConsultatif International Télégraphique et Téléphonique) a 64 kbit/s data signal or a 64 kHz clock signal can be used for recovering the clock frequency. If the clock signal is used for recovering the clock frequency, the frequency of the clock signal can be converted into the desired clock frequency, for example, by means of a clock divider. If the data signal is used for recovering the clock frequency, it should be taken into account that the data signal often does not contain the desired clock frequency. A data signal according to G 703 (CCITT) is, for example, represented as a ternary data signal which is based on a binary information signal encoded in five steps. In this case integrated switching circuits may be used for recovering the clock frequency from the ternary data signal, which circuits are based on a decoding of said code conversion. These circuits, however, represent a considerable cost factor.

SUMMARY OF THE INVENTION

It is an object of the invention to provide a circuit arrangement of the type mentioned in the opening paragraph which enables the recovery of the clock frequency in a simple and cost-effective way.

With a circuit arrangement of the type set out in the opening paragraph this object is achieved in that for alternatively recovering the clock frequency from a data signal or a clock signal, an oscillator circuit is provided, consisting of a winding of a transformer and at least one capacitor connected in parallel to the transformer, which circuit is alternatively connected to a frequency converter converting the data signal rate corresponding with a spectral line into the clock frequency, or connected to a first clock divider converting the frequency of the clock signal into the clock frequency.

Consequently, the circuit arrangement for clock recovery allows of alternatively storing a clock signal or a data signal with little circuitry and cost, while at the output of the circuit arrangement always an output signal having the same clock frequency is available.

BRIEF DESCRIPTION OF THE DRAWINGS

In the following detailed description the invention will be further explained with references to the exemplary embodiments shown in the drawing Figures, in which.

DETAILED DESCRIPTION OF THE PREFERRED EMBODIMENT

Figure 1:
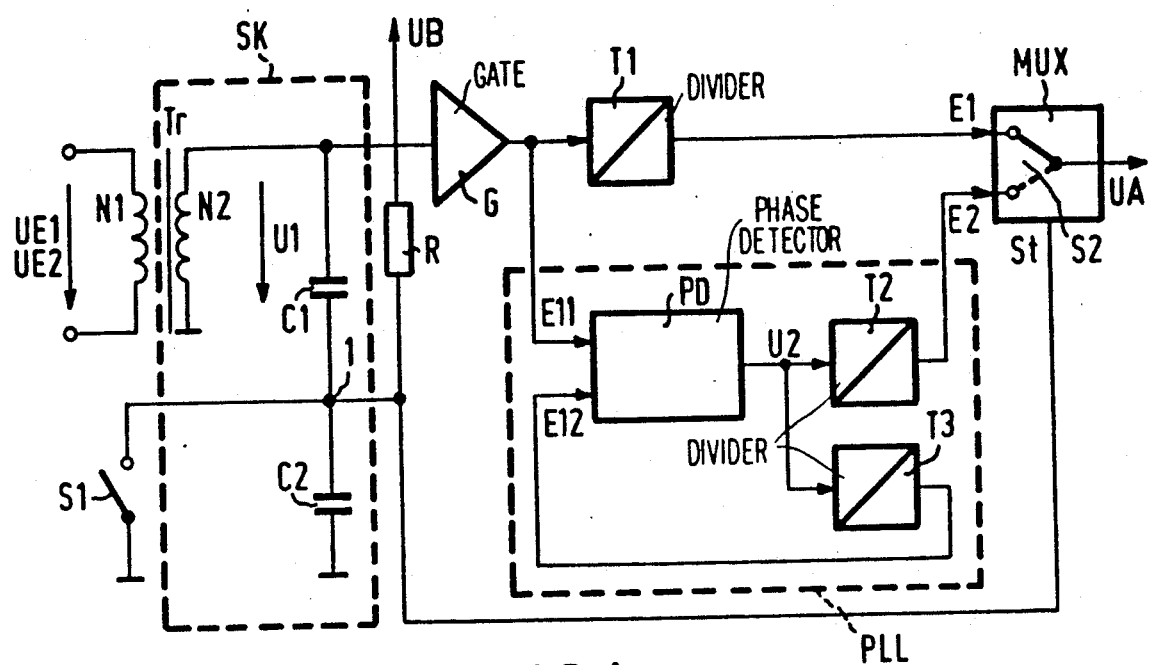
FIG. 1 shows an exemplary embodiment of a circuit arrangement for clock recovery.

In the exemplary embodiment of a circuit arrangement for clock recovery shown in FIG. 1, one of the two signals UE1, UE2 is available as an input signal in parallel with the terminals of a primary winding N1 of a transformed Tr. A series connection comprising a first capacitor C1 and a grounded second capacitor C2 at which the oscillator circuit signal U1 is available is connected in parallel to the terminals of a secondary winding N2 connected to a reference potential (ground). The capacitor C2 can be bridged by means of a switch S1. By means of the secondary winding N2 of the transformer Tr as well as the capacitors C1 and C2 an oscillator circuit SK is formed which is always adjusted to the signals UE1, UE2 respectively. A common junction 1 of the capacitors C1, C2 is connected to a control input St of a change-over device MUX and via a resistor R to the positive pole of a voltage source UB. The oscillator circuit signal U1 is applied to the input of a gate G whose output is connected to a first input E1 of the change-over device MUX through a first clock divider T1 and through a frequency converter PLL to a second input E2 of the change-over device MUX. The frequency converter PLL converts a frequency corresponding with one of the spectral lines SPO. . . SPN of the signal UE1 into an integer multiple of the clock frequency UA at the output of the change-over device MUX. The frequency converter PLL comprises a phase detector PD having two inputs E11, E12 and one output U2. The oscillator circuit signal U1 is applied to the first input E11. The output U2 of the phase detector PD is fed back to the second input E12 of the phase detector PD via a third clock divider T3. A second clock divider T2 whose output is connected to the second input E2 of the change-over device which provides the desired clock frequency UA is inserted after the phase detector PD of the frequency converter PLL. The change-over device MUX changes over a switch S2 between the two inputs E1, E2. The switch S1 is connected to the switch S2 of the change-over device MUX via a control input ST. The signal supplied by either the first clock divider T1 or the second clock divider T2, depending on the state of the switches S1, S2, can be switched by means of the change-over device MUX controlled by the switch S1.

In a practical embodiment of the circuit arrangement for clock recovery either a 64 kbit/s data signal (UE1) according to G 703 (CCITT) or a clock signal (UE2) having a clock frequency of 64 kHz is available as an input signal. The desired clock frequency UA is 32 kHz in both cases.

If a 64 kbit/s data signal (UE1) according to G 703 (CCITT) is available as an input signal, the capacitor C2 is short-circuited because the switch S1 closes and the oscillator circuit SK is adjusted to a spectral line SPO. . . SPN of the data signal UE1, for example, 28 kHz, which is largely independent of the data contents (cf. FIG. 2). Consequently, also the output of the change-over device MUX is switched to the second input E2 of the change-over device MUX. Thus the oscillator circuit signal U1 is switched through gate G and a frequency converter PLL to the input E2 of the change-over device MUX arranged, for example, as a multi-plexer. In the practical embodiment of the circuit arrangement the factor of the third clock divider T3 is 8, the factor of the second clock divider T2 is 1/7. Consequently, 32 kHz appears as the output signal, which is equal to the desired frequency of the output signal UA in the practical embodiment of the circuit arrangement as a result of the multiplication of the factors 1/7, 8 of the clock dividers T2, T3 by the frequency of the signal U1 (28 kHz).

If the switch S1 is open, however, the oscillator circuit SK is adjusted to an input signal UE2 having a clock frequency of 64 kHz as a result of the series connection of the appropriately dimensioned capacitors C1, C2. Through the control input ST of the change-over device MUX connected to the terminal 1 of switch S1 the oscillator circuit signal U1 selected via the oscillator circuit SK is switched to the first input E1 of the multiplexer MUX after passing through gate G and the first clock divider T1 which has the factor ½ in the practical embodiment of the circuit arrangement. The output signal UA thus again has a desired 32 kHz clock frequency.

The circuit arrangement shown enables thus in a simple manner to recover the clock from a data signal, more specifically, from a 64 kbit/s data signal according to G 703 (CCITT) although a 64 kHz clock frequency is not directly contained in the data signal. In addition, the phase of the signal having the clock frequency UA is virtually independent of the bit pattern of the data signal UE2. Consequently, a costly decoding of the data signal by means of integrated circuits may be omitted. On top of this, when using the circuit arrangement as shown in FIG. 1, feeding another input signal, for example, a 64 kHz clock signal, becomes possible when using the same switchable oscillator circuit SK. This reduction of circuitry also leads to a saving of cost.

In the exemplary embodiment shown in FIG. 1 the switch S1 is operated manually. In a preferred embodiment of the invention a recognition circuit is provided changing over the switches S1, S2 in response to the available input signal UE1 or UE2.

Figure 2:
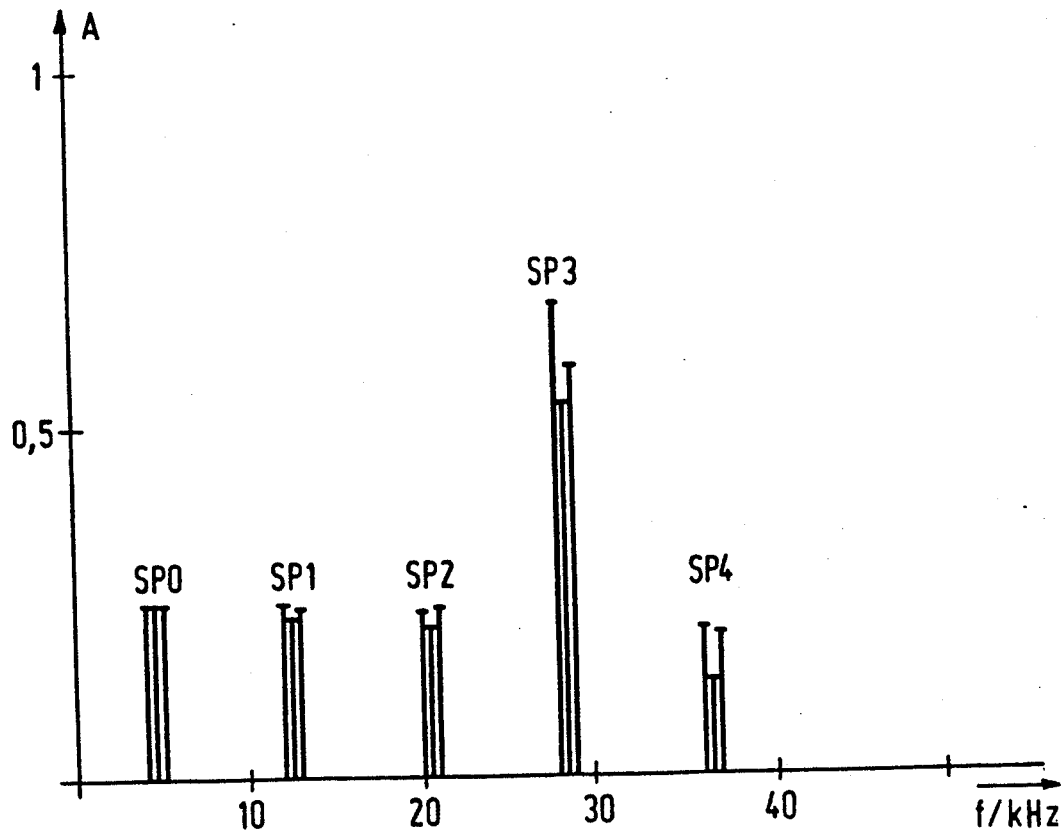
FIG. 2 shows amplitude spectra of three 64 kbit/s data signals.

FIG. 2 shows the amplitude spectra of three ternary 64 kbit/s data signals according to G 703 (CCITT), i.e. amplitude A plotted against frequency f. Each time three 64 kbit/s data signals are used by way of example as the bases for the amplitude spectra. The first and second exemplary signals are based on a binary data signal which constantly has the value "zero" or "one" respectively, whereas the third exemplary signal is based on a binary data signal which presents a "zero" to "one" transition. The amplitude spectra of these three exemplary signals each have spectral lines SP0, SP1, SP2, SP3, SP4 with corresponding frequencies of (4+n*8) kHz, where n is an integer (in this case: 0 to 4). The amplitudes of the resultant spectral lines of the frequencies 4, 12, 20, 28, 36 kHz are virtually independent of the data contents, i.e. they are substantially constant for the three exemplary signals. If, according to a practical embodiment of the circuit arrangement, the spectral line SP3 controls the oscillator circuit SK at a frequency of 28 kHz, by means of the frequency converter PLL following the circuit and accordingly dimensioned, an output signal UA having a 32 kHz clock frequency will be obtained irrespective of the data contents of the data signal UE1, so that a costly decoding of the data signal UE1 by means of integrated circuits may be omitted completely.

I claim:

1. Circuit arrangement for recovering a clock frequency, characterised in that for alternatively producing a clock frequency output signal (UA) at the output of the arrangement from an input signal comprising either an input data signal (UE1) or an input clock signal (UE2) applied to an input of the arrangement, a tuned circuit (SK) is provided comprising a winding (N2) of a transformer (Tr) at the input of the arrangement and at least one compacitor (C1, C2) connected in parallel with the transformer winding, and means for alternatively coupling said tuned circuit in a first circuit path including a frequency converter (PLL) feeding the output of the arrangement for converting a spectral line (SP0 ... SPN) of the input data signal (UE1) into the clock frequency output signal (UA), or a second circuit path including a first clock divider (T1) feeding the output of the arrangement for converting the input clock signal (UE2) into the clock frequency output signal (UA).

2. Circuit arrangement as claimed in claim 1, characterised in that the input signal (UE1, UE2) is formed according to G 703 (CCITT).

3. Circuit arrangement as claimed in claim 1, characterised in that the frequency converter (PLL) comprises a phase detector (PD) that has two inputs (E11, E12) and one output (U2), said first circuit path is such that said tuned circuit (SK) is coupled to the first input (E1), the output (U2) is fed back to the second input (E12) via a third clock divider (T3) and a second clock divider (T2) is fed by the output (U2).

4. Circuit arrangement as claimed in claim 3, characterised in that said means for alternatively coupling said tuned circuit in a first or second circuit path comprises a change-over device (MUX) having two inputs (E1, E2), one input (E1) connected to an output of the first clock divider (T1) and the other input (E2) to an output of the second clock divider (T2).

5. Circuit arrangement as claimed in claim 1, characterised in that said at least one capacitor comprises a first capacitor in series with a second capacitor and in that for producing the clock frequency output signal (UA) from the input clock signal (UE2) the second capacitor (C2) can be bridged by means of a switch (S1).

6. Circuit arrangement as claimed in claim 5, characterised in that the change-over device (MUX) is controlled by said switch (S1).

* * * * *